(12) United States Patent
Höbel et al.

(10) Patent No.: US 7,412,773 B2
(45) Date of Patent: Aug. 19, 2008

(54) METHOD AND DEVICE FOR CONTROLLING THE GEOMETRY OF THE CHASSIS OF A CHAIN OR BELT DRIVEN VEHICLE

(76) Inventors: Glenn Höbel, Am Schulberg 1, 67707 Schopp (DE); Reiner Bayer, Mühlstrasse 1 a, 67707 Schopp (DE)

( * ) Notice: Subject to any disclaimer, the term of this patent is extended or adjusted under 35 U.S.C. 154(b) by 72 days.

(21) Appl. No.: 10/527,393

(22) PCT Filed: Sep. 12, 2003

(86) PCT No.: PCT/DE03/03043

§ 371 (c)(1),
(2), (4) Date: Mar. 11, 2005

(87) PCT Pub. No.: WO2004/027346

PCT Pub. Date: Apr. 1, 2004

(65) Prior Publication Data

US 2005/0268475 A1    Dec. 8, 2005

(30) Foreign Application Priority Data

Sep. 12, 2002   (DE) .............................. 102 42 535

(51) Int. Cl.
*G01C 15/00* (2006.01)
(52) U.S. Cl. .................. 33/286; 33/293; 33/DIG. 21
(58) Field of Classification Search .................. 33/286, 33/293, 412, 529, DIG. 21, 227–228; 356/622
See application file for complete search history.

(56) References Cited

U.S. PATENT DOCUMENTS

| | | | |
|---|---|---|---|
| 6,031,616 A | 2/2000 | Seiffert | |
| 6,098,297 A * | 8/2000 | Belfiore | 33/286 |
| 6,374,507 B1 * | 4/2002 | Lehto | 33/645 |
| 6,434,841 B1 * | 8/2002 | Stahl et al. | 33/286 |
| 6,704,115 B1 * | 3/2004 | Hamar | 356/622 |
| 6,931,738 B2 * | 8/2005 | Bodgren et al. | 33/286 |

(Continued)

FOREIGN PATENT DOCUMENTS

DE    199 83 717    9/2002

(Continued)

*Primary Examiner*—Yaritza Guadalupe-McCall
(74) *Attorney, Agent, or Firm*—Collard & Roe, P.C.

(57) ABSTRACT

According to the invention, in order to control the vehicle geometry of a chain or belt driven vehicle, chain alignment of the secondary drive is determined by means of a laser module (1) which is placed on the lateral surface of the chain wheel or the belt pulley and whose the laser beam is directed to the edge area of the chain or belt. Wheel alignment can also be determined, by arranging two pairs of circular segment shaped calibres (11), which are pressed flat against each other by pressing means (12) on each side of the rim of at least one back wheel and on at least one front wheel of the vehicle, and by emitting parallel laser beams (17) on both sides of one of the calibre pairs to the other calibre pair (17), the laser beams impacting measuring devices (13) which are arranged on both sides of the other pair of calibres. The dimensional accuracy of the swing and the front wheel fork can also be determined in a similar manner.

10 Claims, 8 Drawing Sheets

U.S. PATENT DOCUMENTS

| | | | |
|---|---|---|---|
| 6,968,625 B2 * | 11/2005 | Segerstrom et al. | 33/286 |
| 7,042,561 B1 * | 5/2006 | Andersson | 356/153 |
| 2002/0088128 A1 | 7/2002 | Bremer | |

FOREIGN PATENT DOCUMENTS

| | | |
|---|---|---|
| DE | 100 25 918 | 6/2003 |
| DE | 198 38 172 | 6/2003 |
| DE | 199 14 300 | 6/2003 |
| EP | 0945333 | 9/1999 |
| EP | 1120627 | 8/2001 |
| FR | 2473712 | 7/1981 |
| GB | 2343006 | 4/2000 |

* cited by examiner

METHOD AND DEVICE FOR CONTROLLING THE GEOMETRY OF THE CHASSIS OF A CHAIN OR BELT DRIVEN VEHICLE

CROSS REFERENCE TO RELATED APPLICATIONS

Applicants claim priority under 35 U.S.C. §119 of German Application No. 102 42 535.3 filed on Sep. 12, 2002. Applicants also claim priority under 35 U.S.C. §365 of PCT/DE2003/003043 filed on Sep. 12, 2003. The international application under PCT article 21(2) was not published in English.

The invention relates to a method and a device for checking the chassis geometry of a chain-driven or belt-driven vehicle.

In many areas, particularly in the case of bicycles and motorcycles, a change in position of the chain wheel sometimes occurs, for example due to mechanical stresses, maintenance work, tire changes, or changes of the secondary drive parts. Because of the slanting of the chain wheel relative to the belt or the chain that occurs as a result, irregular and greater wear occurs than in the case of correct alignment. The same is also true for other belt drives or chain drives, for example in the case of machinery.

It is known, as the state of the art, to check the alignment of belt or chain with the belt pulley or with the chain wheel, respectively, by means of strings or featheredges, but this is both time-consuming and inaccurate.

Furthermore, it is known to provide markings at the axle accommodation of motorcycles. However, these are not very reliable, since even a slightly incorrect position results in errors of several millimeters over the length of the chain. There is hardly any possibility of checking the adjustment, except with expensive measurement methods that are hardly suitable for routine inspections in workshop operations.

A device for checking the chain alignment in motorcycles is known, in which a laser is disposed under the vehicle, on a slide rail that is attached at the center of motion of the swing arm. Templates are affixed to the rear wheel, on the sides, at which the laser beam is directed. In this device, however, it proves to be disadvantageous that placement can only be accomplished with a motorcycle jack and with significant effort. Furthermore, the templates are placed against the tire rubber, on the sides, which results in a relatively great measurement error. Finally, the device is relatively expensive.

In the case of the device described above, the two templates are connected by way of a rod that can be fixed in place, which must be passed through the wheel, past the rim well. In the case of a disk wheel, this is not possible, and therefore this device cannot be put in place in the case of a closed carrier between the rim well and the wheel axle.

A device and a method for aligning at least one alignable plane with regard to at least one reference plane are known from DE 199 83 717 T1. This device particularly serves to align a driving wheel relative to a driven wheel, or vice versa, and has a main part, a light source, and a number of contact points, whereby the light source is configured to emit a laser beam in a plane, at a scattering angle. This device, too, is relatively complicated, and in many cases requires the time-consuming removal of protective devices from at least one of the wheels of the belt drive or chain drive, e.g. the removal of a protective plate or a chain guard.

Likewise, a device for aligning belt pulleys by means of laser beams is known from DE 100 25 918 A1, in which a laser beam transmitter is placed against a face of a first pulley and a flat beam emitted by this laser transmitter falls on targets that are laid against the face of the second belt pulley. DE 199 14 300 A1 also describes an alignment measurement device for belt pulleys disposed with parallel axes, in which the work is also carried out using targets disposed on the face of the belt pulley. However, in many cases, particularly in the case of two-wheelers, the second belt pulley is only accessible with difficulty, so that this device can only be used after the second belt pulley has been exposed.

Furthermore, a measurement device for aligning belt pulleys is known from DE 198 38 172 A1, in which a laser is disposed on one of the belt pulleys when the belt has been removed, and is directed at the center rib of the other belt pulley. However, this is only possible when the belt has been removed, and this restricts the use of this measurement device to an extraordinary degree. In the case of motorcycles with a swing arm rear suspension, the center of motion of the swing arm lies between the chain wheel of the rear wheel and the engine pinion. Therefore the view of the pinion is covered.

In the case of the chassis geometry of a chain-driven or belt-driven vehicle, particularly in the case of bicycles, motorcycles, motorcycles with side cars, trikes and ATV quads, not only is the arrangement of the two chain wheels or belt pulleys relative to one another significant, but also the track of the vehicle, which has a massive influence on the behavior in curves, for example. Because of design constraints and series variations in mass production, a track offset to a non-slight degree can be present in the case of motorcycles produced in large series. A track offset of 0 mm is optimal in the case of single-track vehicles. In practice, the general opinion is that a tolerance of up to 2 mm is defensible. An overly great track offset can have a negative effect on the handling ability, the steering ability (handlebar out of true), straight running, and the steering precision. The simplest method for correcting track offset is to distance the rear wheel out in the swing arm, whereby the position of the chain wheel is not allowed to be changed at correct alignment to the drive pinion.

It is therefore known, from U.S. 2002/0088128 A1, to place devices on the side, onto the tires of a motorcycle, one of which carries laser arrays on the side, and the other of which carries measurement arrays onto which the laser beams fall. However, it is a disadvantage of this device that because of the unevenness and the elasticity of the tires, the devices are very difficult to align parallel with one another, so that no parallel laser beams can be sent from one tire to the other. This solution is therefore unsuitable because of the great inaccuracy of the measurement.

The invention is therefore based on the task of creating a method and a device with which the chassis geometry of a chain-driven or belt-driven vehicle can easily and quickly be checked.

This task is accomplished, according to the invention, by means of a method for checking the chassis geometry of a chain-driven or belt-driven vehicle, which has the following method steps:

Determining the chain alignment of the secondary drive by means of a laser module that is placed on the lateral surface of the chain wheel or belt pulley, and whose laser beam is directed at the edge region of the chain or the belt, respectively.

Here, the flat outside region is placed against the flat lateral surface of the belt pulley or the chain wheel, so that the laser beam is directed at the edge region of the belt or the chain, respectively. Then, in the case of proper belt or chain alignment, a number of laser points results on the edge region of the belt or the chain, over an extended distance, with the distance from the edge remaining the same. If this is not the case, a frame/swing arm offset exists, as it occurs after accidents, for example. The device is both very small and very robust, and is suitable both for inspections on the road (e.g. after a tire change or after a breakdown) and for routine inspections in the workshop sector. This method of procedure has the advantage that it can take place without disassembly of parts, because the belt pulley or the chain wheel of the rear wheel and the chain are accessible at least to the extent required for the inspection. In the case of the pinion, this is frequently not true. Particularly in the case of motorcycles, the drive pinions are always covered, partly also by engine block parts, the rear wheel swing arm suspension, or frame parts, so that exposure of the drive pinion is very complicated.

It lies within the framework of the invention that any incorrect chain alignment that is found is subsequently corrected.

If it is not possible to adjust the chain alignment precisely and thereby to set the rear wheel axle at a 90° position relative to the longitudinal axis of the vehicle, there is a problem in the chassis geometry. Therefore chassis defects can be recognized, and their cause can actually be determined.

A further development of the invention consists in the following additional method step, which takes place before or after the first method step:

Determining the wheel alignment of the vehicle, in that two pairs of arc-shaped gages, which are pressed flat against one another by way of contact pressure means, are disposed on both sides on the rim of at least one rear wheel and at least one front wheel of the vehicle, and on both sides, parallel laser beams are transmitted from one pair of gages to the other pair of gages, which beams impact the measurement devices disposed on both sides on the other pair of gages.

The arc-shaped gages are placed against the rim edges of a rear wheel and a front wheel, on both sides, in each instance, which wheels offer a sufficiently large, smooth, and easily accessible placement surface. By means of the contact pressure means, the gages are pressed against the rims, so that they are disposed parallel to one another, thereby also causing the laser beams to run parallel to one another.

In this manner, the track of the vehicle can be checked quickly and precisely, so that deformations of the fork, for example, resulting from an accident can be easily detected. Likewise, in this manner, the track can be checked during assembly or maintenance of the vehicle, with a subsequent adjustment of the track.

This can, of course, also be used in the construction of so-called custom bikes, whereby the position of the engine/gear unit, the chain path, and the wheel axle position must be determined first. Likewise, this method of procedure is also suitable for so-called trikes, and for motorcycles with a sidecar, whereby the laser module or the measurement devices can be lengthened as needed.

Another further development of the invention consists in the fact that the following method step takes place:

Determining the dimensional stability of the swing arm by means of two laser modules, which are disposed on both sides of the hollow axle of a wheel, and whose laser beam is directed at rulers disposed on both sides, at the center of motion of the swing arm.

The region of the swing arm mounting on the vehicle frame is one of the low-torsion regions of the vehicle. The region of the rear wheel axle is designed more for torsion, but should be dimensionally stable in the static state. This dimensional stability can be checked in that the laser modules are disposed on both sides in the opening of the hollow axle of a wheel, preferably by means of cones and centering units, and a laser beam is directed at self-centering rulers that are disposed at the center of motion of the swing arm. In this manner, it can be read off on the ruler whether the axles are located in the same plane.

Another further development of the invention consists in the following additional method step, which takes place before or after the first method step:

Determining the dimensional stability of the front wheel fork, in that a pair of arc-shaped gages, which are pressed flat against one another by way of contact pressure means, are disposed on both sides on the rim of the front wheel of the vehicle, and laser beams are transmitted on both sides of the pair of gages, along the fork crosspiece, which beams impact on measurement devices disposed along the fork crosspiece.

In this manner, it can be determined, for example, whether and what region of the relatively sensitive front wheel fork is deformed.

In the case of a device for implementing the method according to the invention, it is provided that the device consists of at least two pairs of arc-shaped gages that can be pressed flat against one another by way of contact pressure means, and are configured to rest against the rim of at least one rear wheel and at least one front wheel of the vehicle, on both sides, whereby laser modules are disposed on both sides of the first pair of gages, with which parallel laser beams can be emitted, and measurement devices are disposed on both sides of the second pair of gages, which are impacted by the laser beams.

Furthermore, it is advantageous that the laser modules can be pivoted about an axis that stands perpendicular to the arc-shaped gage, in each instance, and/or that beams can be emitted by the laser modules in a horizontal plane.

According to the invention, it is provided that the contact pressure means are configured as spring-elastic stirrups that connect the gages of a pair of gages with one another, around the wheel, in each instance.

An advantageous embodiment of the invention consists in the fact that the stirrups are configured to be approximately triangular in shape.

These therefore extend around the wheel of the vehicle, in each instance, and nevertheless exert a sufficient contact pressure.

Likewise, it is practical that the measurement devices are configured as rulers that can be inserted into bores in the gages.

In the following, exemplary embodiments of the invention will be described using drawings.

These show:

FIG. 1a and

Figure 1A:
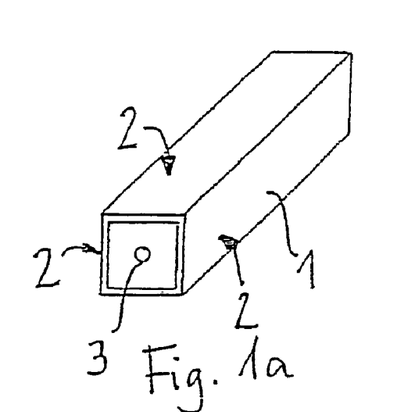
Figure 1B:
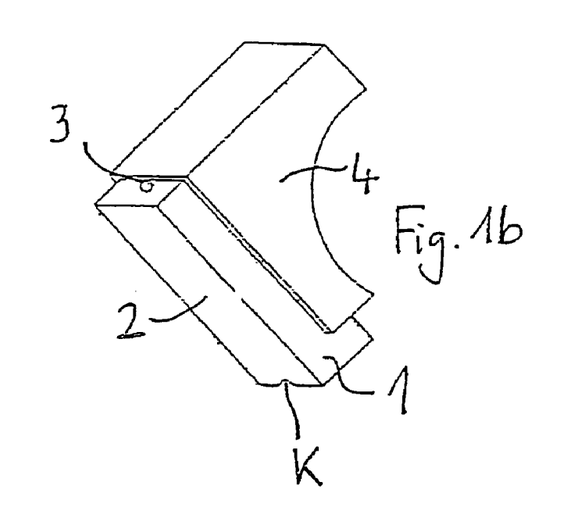
FIG. 1b two exemplary embodiments of a device according to the invention.

As is evident from FIGS. 1a and 1b, the device for checking the chain alignment consists of a housing 1 having a flat outside region 2, which serves as the contact surface. A laser module is disposed in the housing 1, in such a manner that a laser beam that is disposed parallel to the flat outside region, which exits from the housing 1 at the exit point 3, can be generated. The laser can be a point laser or a line laser.

In order to be able to operate the device in wireless manner, it is practical if a power supply (e.g. a battery) for the laser module is disposed on the housing 1. Furthermore, the housing is preferably provided with an activation switch for the laser module as well as (FIG. 1*b*) with a handle part 4. From FIG. 1*b* it is furthermore evident that a notch (K) is provided at an angle of 90° to the flat outside region 2, on the side lying opposite the exit point, which can be laid against the teeth of a belt drive, in order to check the alignment. Alternatively, a wedge-shaped contact possibility can also be provided, instead of the notch (K).

Figure 2A:
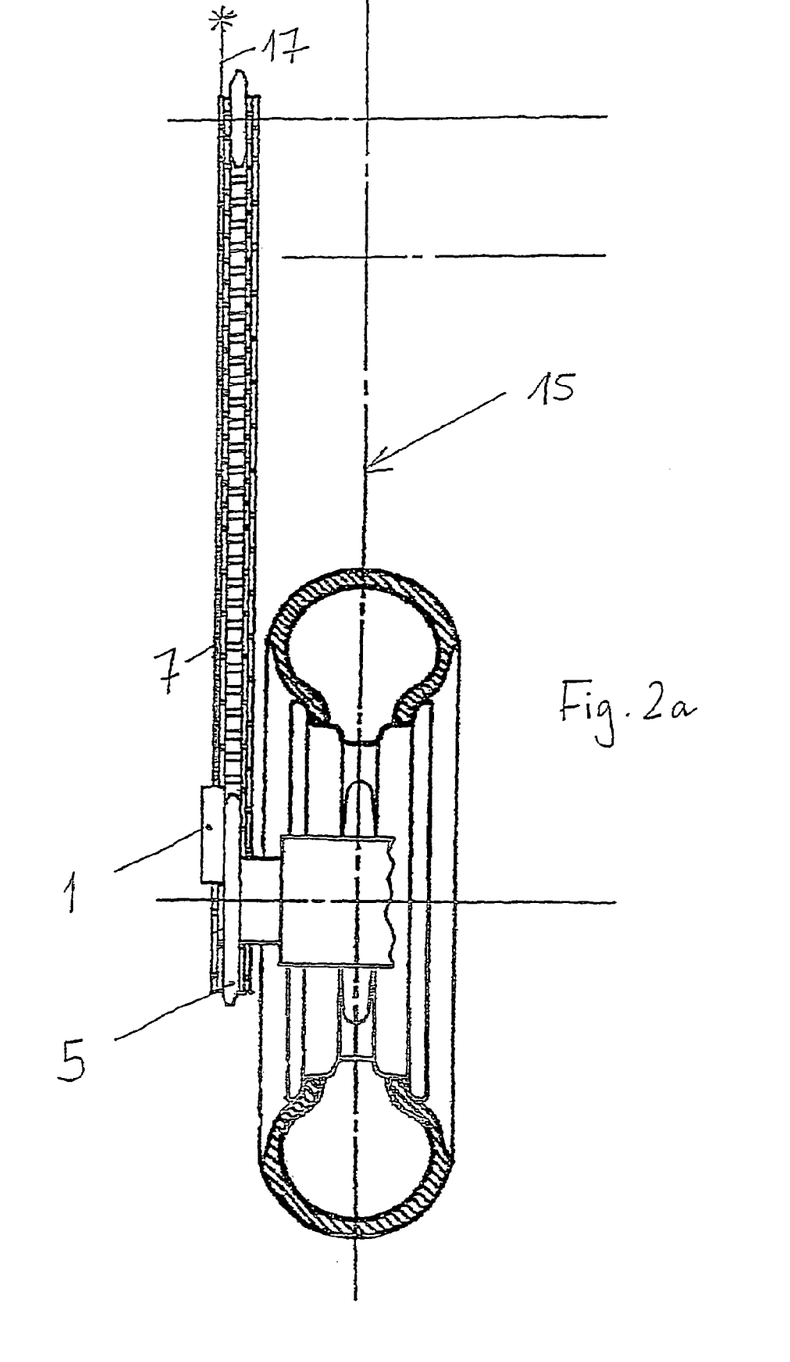
FIGS. 2a and 2b inspection of the chain alignment using the two devices according to FIG. 1a and FIG. 1b, FIG. 3 an ancillary means as a reference part for checking the belt alignment, FIG. 4 inspection of the belt alignment using the device according to FIG. 1b and the angled rail according to FIG. 3, FIG. 5 the arc-shaped gages to be placed against the rims, FIG. 6 the use of the gages according to FIG. 5 to check the track, FIG. 7 an additional inspection of the front wheel fork, FIG. 8 the case configurations in the inspection according to FIG. 7.
Figure 2B:
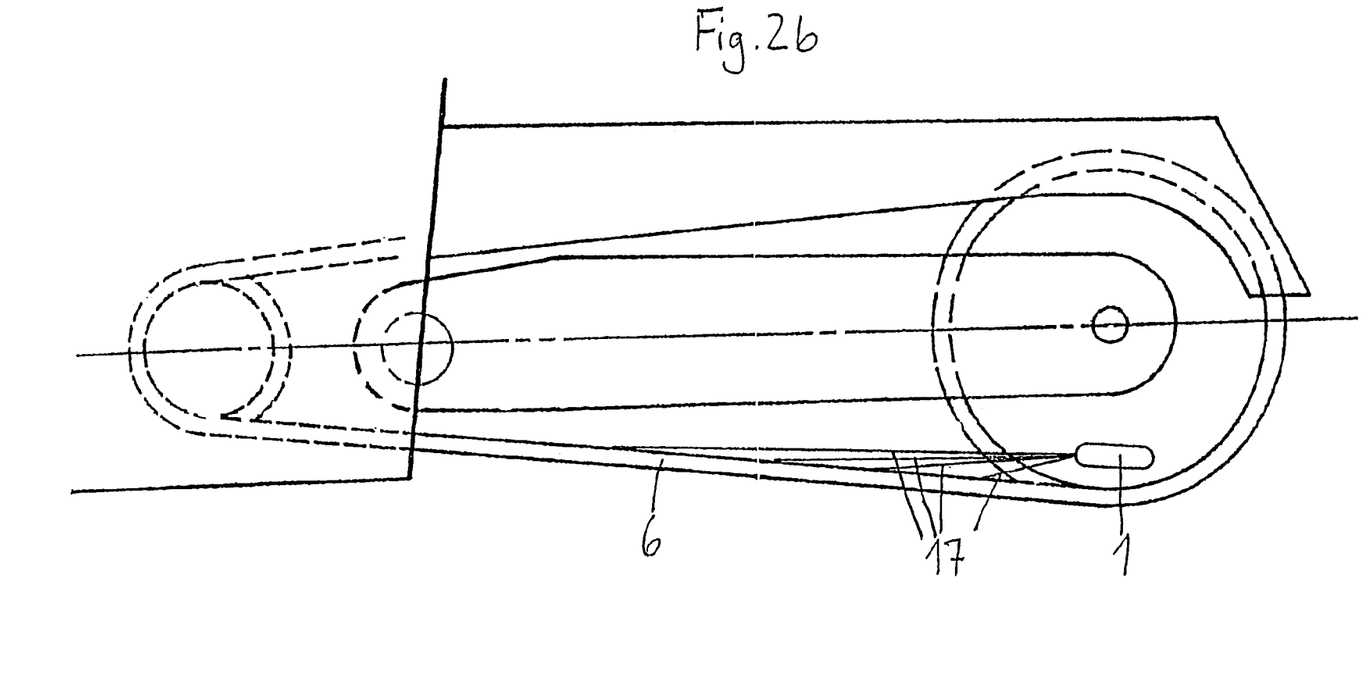
Figure 3:
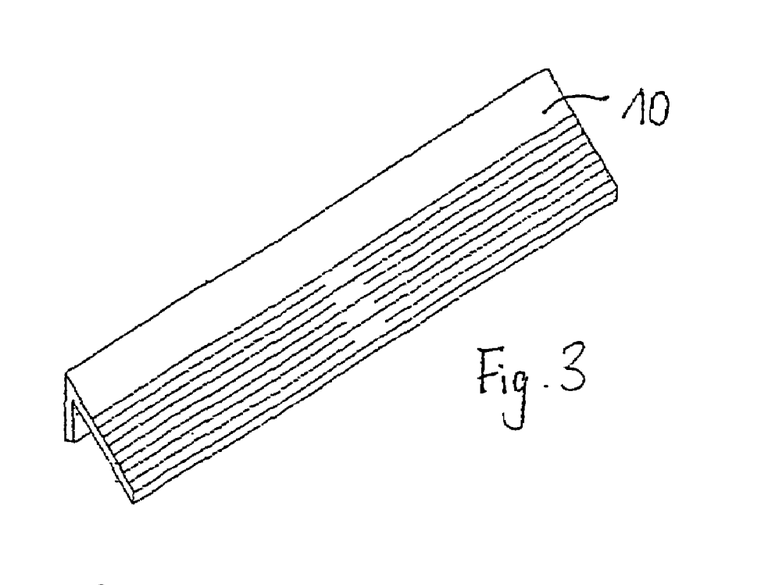

In the case of chain drives, the housing 1 is placed against the face of the chain wheel 5 with its flat outside region, to check the chain alignment (FIG. 2*a*, 2*b*). Since the laser beam generated by the laser module is spaced as far apart from the flat outside region as the edge region of the chain 6 is spaced apart from the lateral surface of the chain wheel 5, the laser beam runs along the edge region 7 of the chain 6 in the case of correct chain alignment. It is also possible that the laser beam runs parallel to the chain 6. If the chain alignment is insufficient, it can easily be determined that the laser beam runs away from the edge region of the chain 6.

Figure 4:
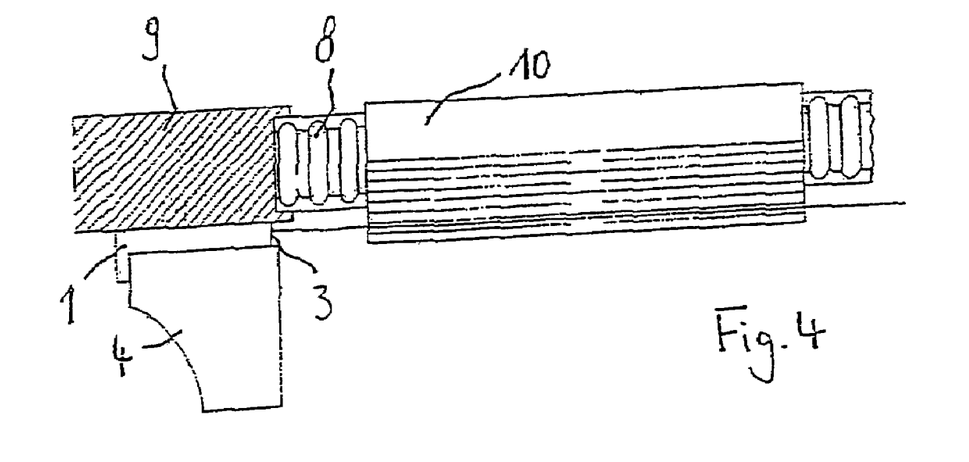

When checking the alignment of belt drives, there is the problem that the belt 8 is usually set back relative to the belt pulley 9 (FIG. 4). For this reason, an elongated angled profile 10, for example (or a different reference object) is used, which is laid against an edge of the belt 8 and whose parallel measurement lines can then serve to check the alignment of the belt.

Alternatively, it can also be provided that the housing 1 of the device, in the front region, is also offset relative to the flat outside region, so that the flat outside region is laid against the outer side of the belt pulley 9 and the laser beam is directed at the belt 8 in the direction of its progression.

Figure 5:
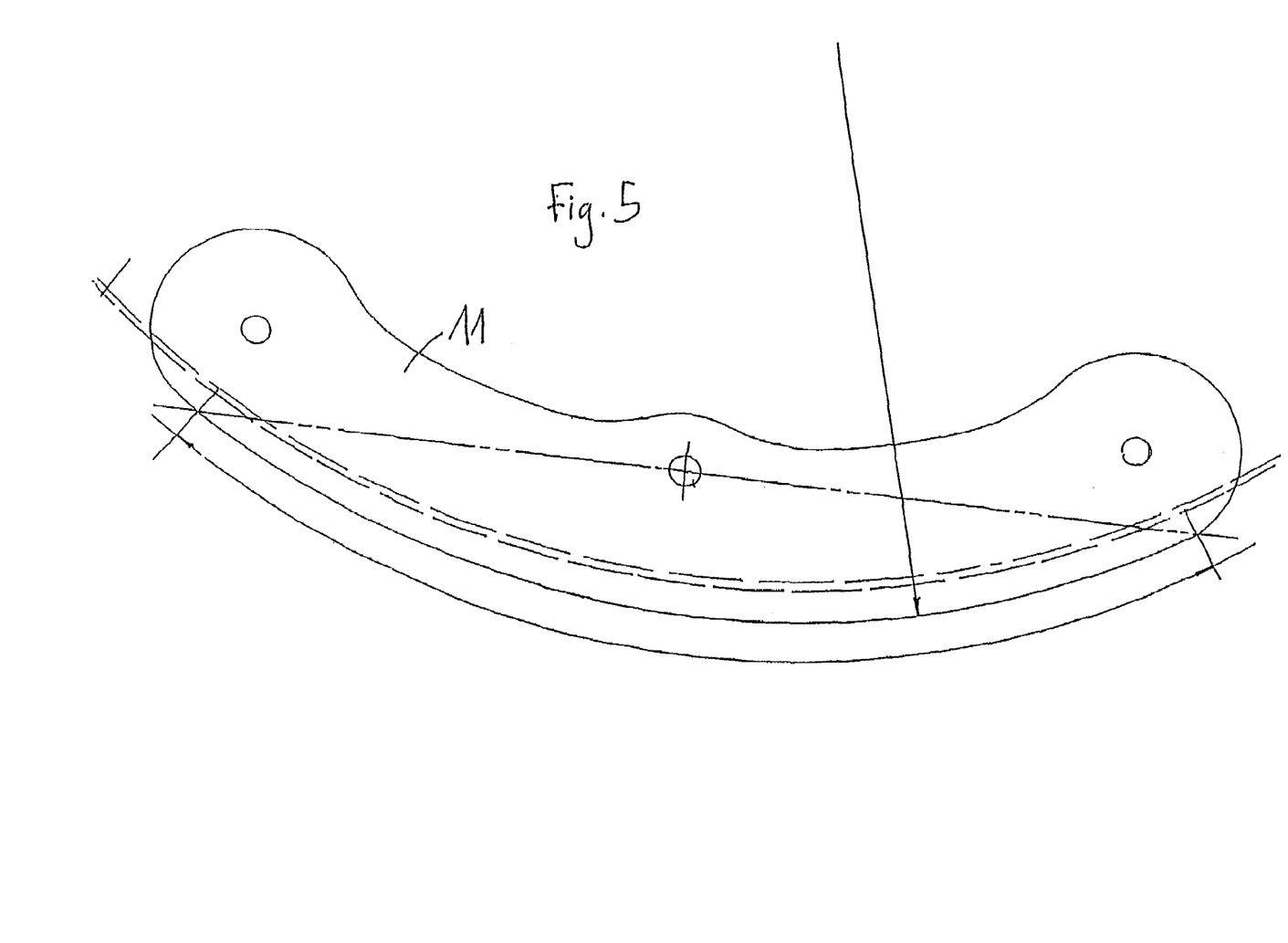

FIG. 5 shows a top view of one of the arc-shaped gages 11, which is laid against the rim or against the rim edge of the vehicle. The device can have a length of approximately 30 cm, for example, so that a large contact area is formed. Two of these gages 11, in each instance, are pressed together by means of a contact pressure means 12 in the form of a spring-elastic stirrup 12, so that they come to rest, parallel, on the rim. In order to achieve a good introduction of force, the spring-elastic stirrup 12 is configured to be approximately triangular. One of the pair of gages 11 is provided with a laser module on both sides, which emits a laser beam, parallel to the longitudinal vehicle axis 15, which beam impacts a measurement device 13 in the form of measurement rulers 13 that are inserted into the other gage and extend perpendicular to it. If the same distance is found on both sides, there is no track offset; if the distance is not the same, there is track offset.

Figure 6:
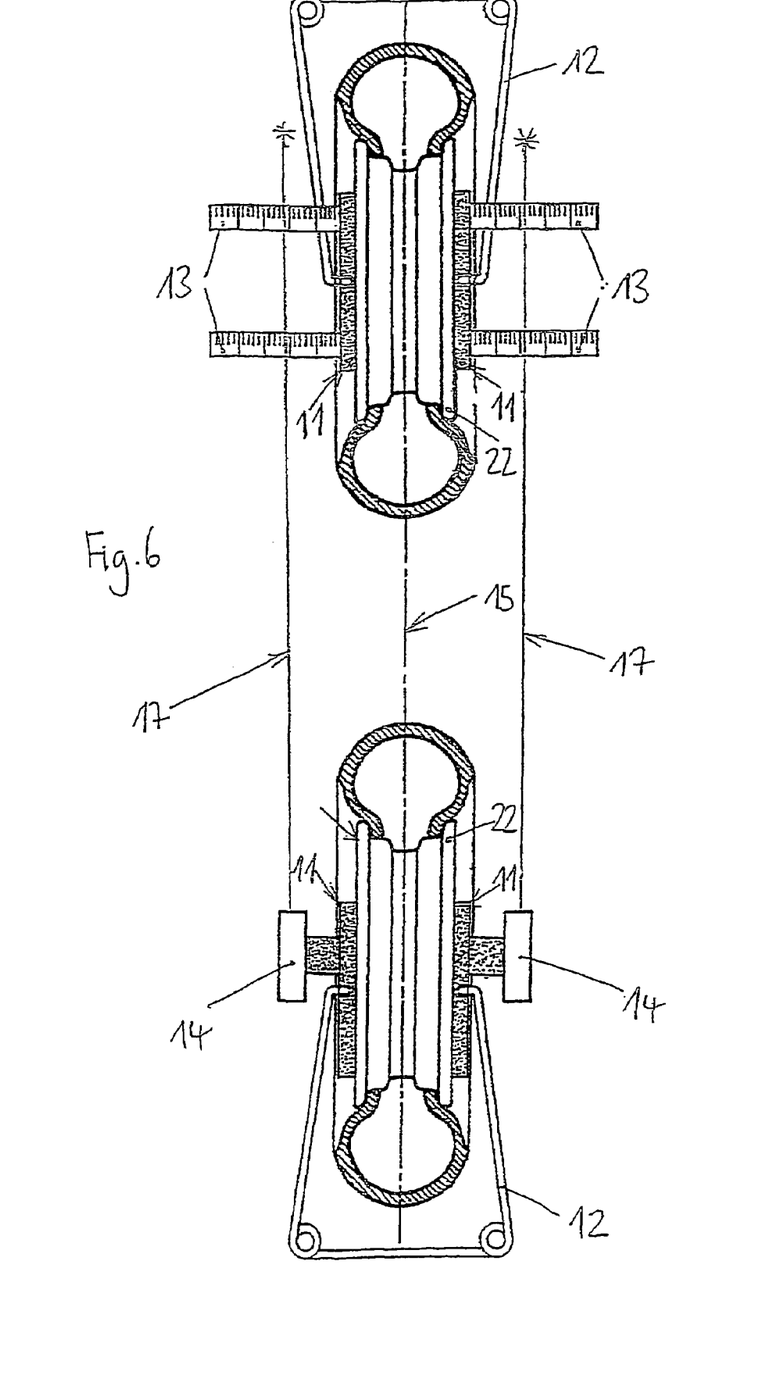

Finally, FIG. 6 shows how the device according to the invention can be used for checking the track of a motorcycle. For this purpose, the arc-shaped gages 11 are placed against the lateral edges of the rims on both sides of every wheel, and attached in this position, e.g. by way of the spring clips 12 shown, which extend around the running surface of the wheel from one side to the other side of the wheel. The devices according to the invention are attached to the gages 11 of the one wheel, in each instance, or at least laid against the wheel with the flat outside region, so that one laser beam, in each instance, is emitted parallel to the longitudinal axis of the motorcycle all the way to the gages 11 disposed on the other wheel, having measurement rulers 13 that project perpendicular away from them. It can then be read on the measurement rulers 13 whether the same distance is present on both sides.

Figure 7:
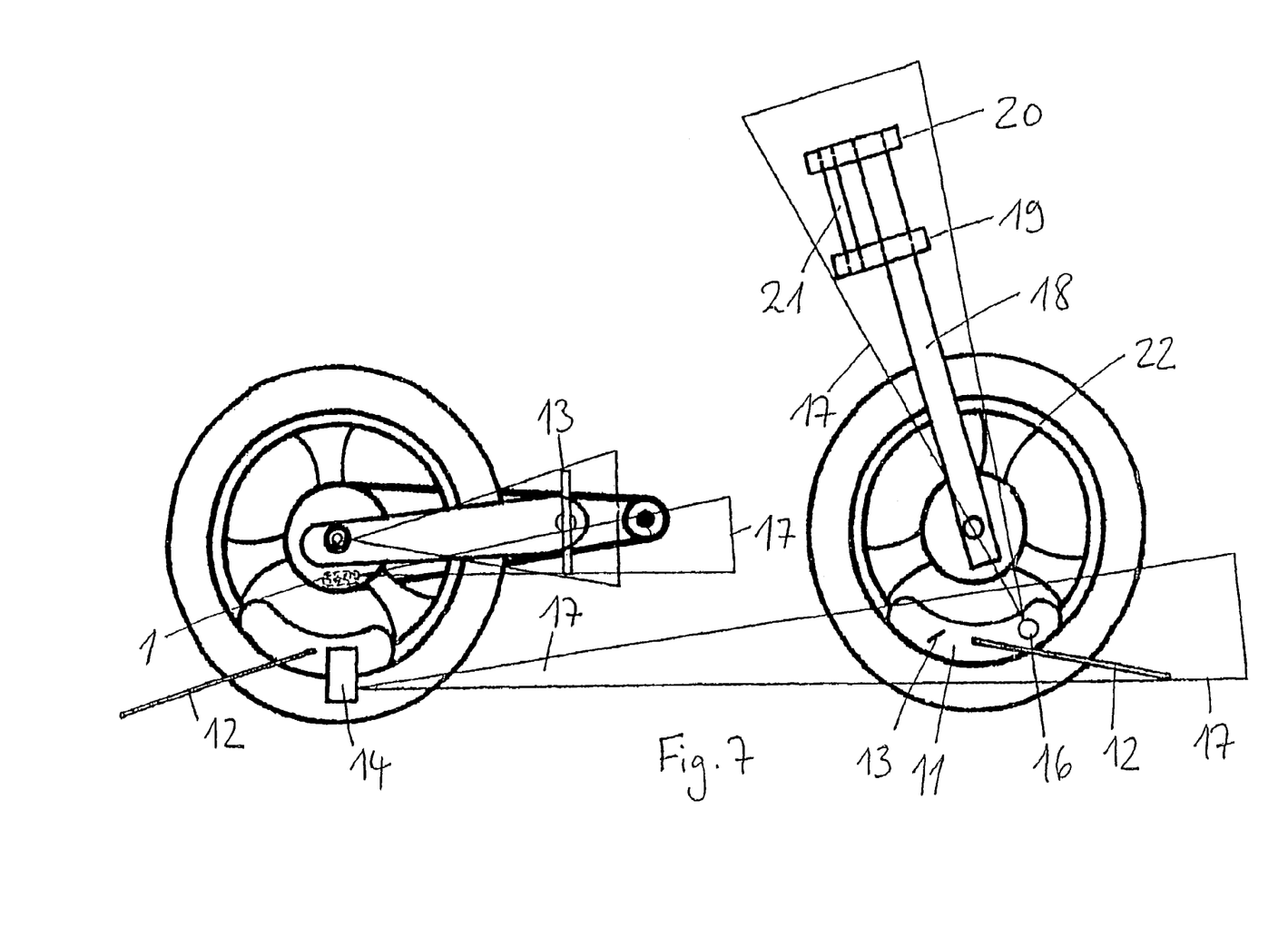

Furthermore, a laser beam 17 can also be directed by two laser modules 16 on the gages 11 disposed on the rim 22 of the front wheel, on both sides along the fork crosspiece 18, at measurement rulers disposed on the latter, and furthermore up to the upper fork bridge 19, 20 to the steering shaft 21, i.e. the steering head of the frame, as shown in FIG. 7. In this connection, it is possible that the laser module 16 is an integral part of the measurement rulers 13 disposed on the gages 11.

Figure 8:
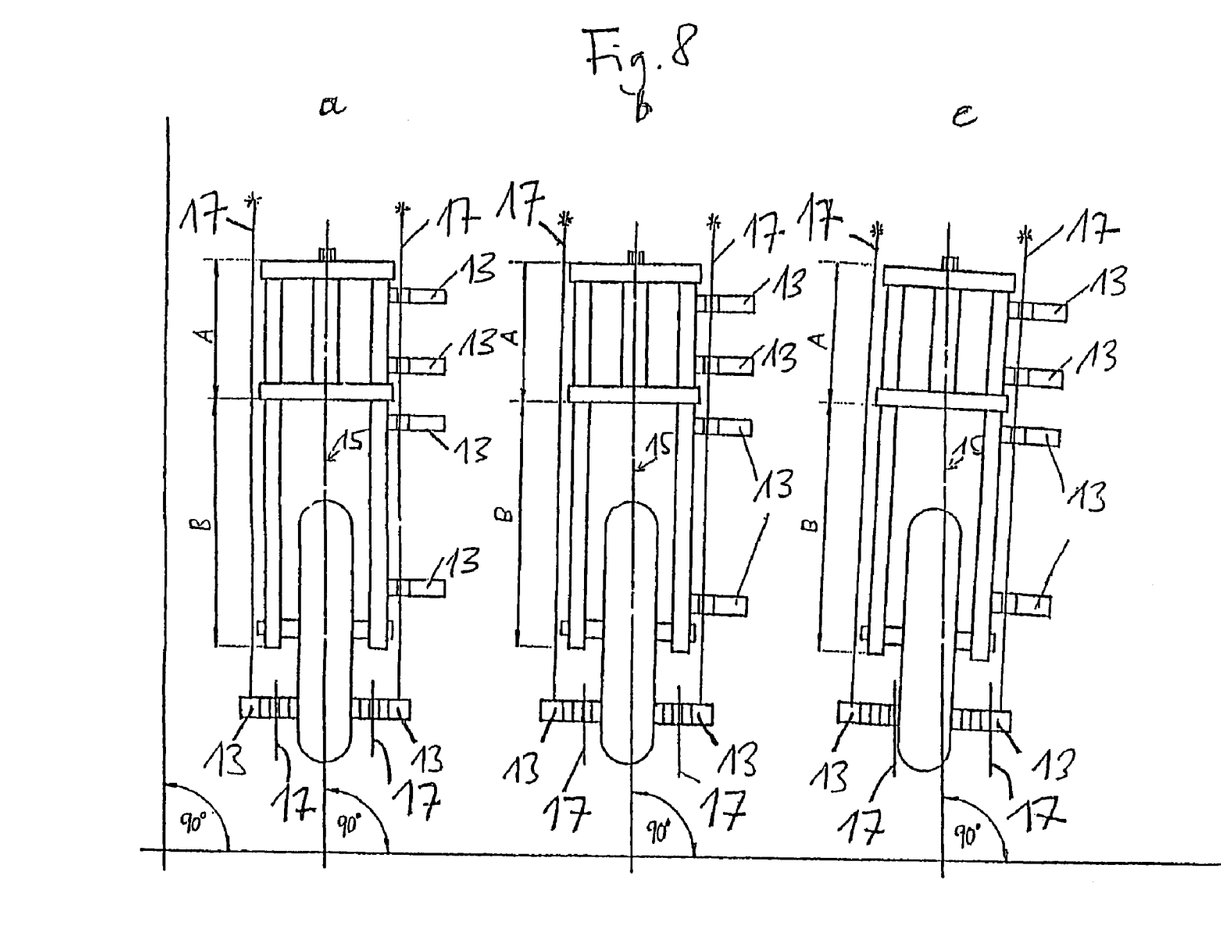

FIG. 8 shows different case configurations in a front view of the front wheel fork, and the conclusions to be drawn from them, during such an inspection of the front wheel fork.

In the case of FIG. 8*a*, the regions A and B are parallel to the centerline of the vehicle, and the front wheel is disposed parallel to the center axis of the vehicle (the same values are determined on all measurement rulers, in each instance, on the right and on the left). Therefore the front wheel, the fork, and the steering head pipe of the frame are disposed precisely on the centerline of the vehicle. The track of the vehicle is correct.

In FIG. 8*b*, the region A is disposed parallel to the centerline of the vehicle, the front wheel and the region B are not. The track is therefore not correct. The steering head pipe is aligned parallel to the centerline of the vehicle, and therefore not distorted relative to the frame. However, the fork region B below the lower fork bridge is damaged.

In FIG. 8*c*, neither the region A nor the region B nor the front wheel is disposed parallel to the centerline of the vehicle. In this case, the steering head pipe (steering head) is distorted relative to the vehicle frame. The fork regions A and B are undamaged.

The invention claimed is:

1. A method for checking the chassis geometry of a chain-driven or belt-driven vehicle, comprising the following method step:
   Determining the chain alignment of a secondary drive by means of a laser module that is placed on the lateral surface of the chain wheel or belt pulley, and whose laser beam is directed at the edge region of the chain or the belt, respectively.

2. The method according to claim 1, wherein subsequently, any incorrect chain alignment that is found is corrected.

3. The method according to claim 1, further comprising the following additional method step, which takes place before or after the first method step:
   Determining the dimensional stability of a swing arm of a rear wheel of the vehicle by means of two laser modules, which are disposed on both sides of the hollow axle of the wheel, and whose laser beam is directed at rulers disposed on both sides, at the center of motion of the swing arm.

4. A method for checking the chassis geometry of a chain-driven or belt-driven vehicle, comprising the following method step:
   Determining the chain alignment of a secondary drive by means of a laser module that is placed on the lateral surface of the chain wheel or belt pulley, and whose laser beam is directed at the edge region of the chain or the belt, respectively; and
further comprising the following additional method step, which takes place before or after the first method step:
   Determining the wheel alignment of the vehicle, in that two pairs of arc-shaped gages, which are pressed flat against one another by way of contact pressure means, are disposed on both sides on the rim of at least one rear wheel and at least one front wheel of the vehicle, and on both sides, parallel laser beams are transmitted from one pair of gages to the other pair of gages, which beams impact the measurement devices disposed on both sides on the other pair of gages.

5. A device for implementing the method according to claim 4, comprising at least two pairs of arc-shaped gages that can be pressed flat against one another by way of contact pressure means, and are configured to rest against the rim of at least one rear wheel and at least one front wheel of the vehicle, on both sides, whereby laser modules are disposed on both sides of the first pair of gages, with which parallel laser beams can be emitted, and measurement devices are disposed on both sides of the second pair of gages, which are impacted by the laser beams.

6. The device according to claim 5, wherein the laser modules can be pivoted about an axis that stands perpendicular to the arc-shaped gage, in each instance, and can be locked in place in any desired pivot position and/or that beams can be emitted by the laser modules in a horizontal plane.

7. The device according to claim 5, wherein the contact pressure means are configured as spring-elastic stirrups, which connect the gages of a pair of gages around the wheel of the vehicle, in each instance.

8. The device according to claim 7, wherein the stirrups are configured to be approximately triangular.

9. The device according to claim 5, wherein the measurement devices are configured as rulers that can be inserted into bores of the gages.

10. A method for checking the chassis geometry of a chain-driven or belt-driven vehicle, comprising the following method step:

Determining the chain alignment of a secondary drive by means of a laser module that is placed on the lateral surface of the chain wheel or belt pulley, and whose laser beam is directed at the edge region of the chain or the belt, respectively; and further comprising the following additional method step, which takes place before or after the first method step:

Determining the dimensional stability of the front wheel fork, in that a pair of arc-shaped gages, which are pressed flat against one another by way of contact pressure means, are disposed on both sides on the rim of the front wheel of the vehicle, and laser beams are transmitted on both sides of the pair of gages, along the fork crosspiece, which beams impact on measurement devices disposed along the fork crosspiece.

* * * * *